July 10, 1923.

T. H. MARTEN 1,461,132

METHOD OF PRODUCING VISUAL DEPTH IN PROJECTED PICTURES

Filed April 3, 1922

Inventor:
Thomas Henry Marten.
H. J. S. Dennison Atty.

Patented July 10, 1923.

1,461,132

UNITED STATES PATENT OFFICE.

THOMAS HENRY MARTEN, OF TORONTO, ONTARIO, CANADA.

METHOD OF PRODUCING VISUAL DEPTH IN PROJECTED PICTURES.

Application filed April 3, 1922. Serial No. 549,005.

*To all whom it may concern:*

Be it known that I, THOMAS HENRY MARTEN, a subject of the King of Great Britain, and resident of the city of Toronto, county of York, Province of Ontario, in the Dominion of Canada, have invented certain new and useful Improvements in a Method of Producing Visual Depth in Projected Pictures, described in the following specification and illustrated in the accompanying drawings, that form part of the same.

The principal objects of the invention are, to produce more attractive and natural appearing pictures and to eliminate a certain degree of eye strain, commonly resulting from viewing pictures projected upon a screen.

The principal feature of the invention consists in locating upon a plane surface and about the picture a secondary picture adapted to create and maintain a flexible focal adjustment in the eye of the observer to automatically adjust itself to the varying conditions of depth or distance represented in the combined pictures, such result being accomplished by utilizing the tendency of the eye to automatically adjust itself to changes in the visual angle of objects within the vision field.

It is very well known to those conversant with the picture producing art that the eye of the observer, after a brief period of first viewing a picture, becomes accustomed to the fact that the visual observation is confined to a flat surface.

The eye in its normal function and under ordinary conditions is constantly changing focus and if conditions surrounding a picture are such as to maintain this normal activity, then the eye will function normally and read into the picture the third dimension of depth.

This is quite noticeable in that when first entering a theatre where a picture is being shown, it distinctly shows the element of depth but after it has been viewed for a short time the eye assumes a fixed focus and the picture assumes a flat appearance which is unnatural and causes eye strain.

The principle of the third dimension in vision is partly based on the fact that we have two eyes and the mental reaction with the optic nerves is such as to judge distance by reason of binocular convergence but such convergence is not the only element or component of general vision which produces the visual physical sensation of the third dimension and in order that a thorough understanding of the present invention be had a statement of visual conditions may be made in the following terms:

First: the psychological reaction to the physiological action of the function of convergence by binocular cooperation to locate the position of the object;

Second: the psychological reaction to the physiological action of the function of focal adjustment of the optic lens to produce a sharp retinal image of the object wherever located.

Third: the purely psychological element of the association of real objects with each other as they are known to be through experience with them in our three dimensional world.

Ordinarily the observer is consciously or sub-consciously experiencing the physical sensation of the change of the angle of convergence and the same is true of the change of the focus of the optic lens. The observer is accustomed to consciously or sub-consciously experience the direct association between the function of convergence and the function of focal adjustment and upon the distance of the observer from the object looked at will depend the magnitude of the angle of convergence and the degree of focal adjustment, both becoming less as the distance is increased but both maintaining true association each with the other which is a normal sensation.

When a picture is projected on to a plane surface at a distance close enough to form a conscious angle of convergence the eye adjusts itself to this condition and the sensation produced is that both the angle of convergence and the focal adjustment are held fixed in that no one part of the plane surface requires a change of convergence or focal adjustment as compared with any other part and when the eyes, which nature has furnished as measuring instruments, form a fixed angle of convergence combined with a fixed focus they read only in two dimensions, namely, height and breadth. This suspends the normal activity of the muscular system controlling the optic mechanism of the observer, that is to say, the normal flexing and reflexing of the muscles of the eyes are suspended and the abnormal condition produced is what produces eye strain.

In the ordinary conditions of vision the senses may be specifically focused upon an object a certain distance from the eye but there are other elements which are affecting such senses sub-consciously in the form of other objects nearer or farther away.

It is of course well established that we judge distance by the visual size of the object and while this is carried into effect in screened pictures and we observe and properly interpret that an object is in the immediate foreground or far away, yet there is a known fixed distance between the observer and the picture and this produces the condition of fixed focus in the eyes of the observer as above set forth and results in the effect of a flat and unnatural picture.

This invention proposes to introduce an element outside of the actual central picture depicted which will maintain normal focal activity.

It is well known that as objects approach the observer their visual dimensions and brightness or visibility increase and comparative location is judged by these conditions. If therefore an element is introduced in the visual angle which simulates a change in distance the eye will react to the suggestion and be relieved of the fixed focal and resultant straining effect of the central picture.

The invention is diagrammatically illustrated in the drawings, Figure 1 being the diagram of a flat screen.

The area A represents the main or central picture which is surrounded by the area B and upon this marginal area is projected the image C of an object or objects which will form a suitable setting for the picture, such as an architectural structure, or a frame, which may be supplemented by hangings as shown.

Figure 1:
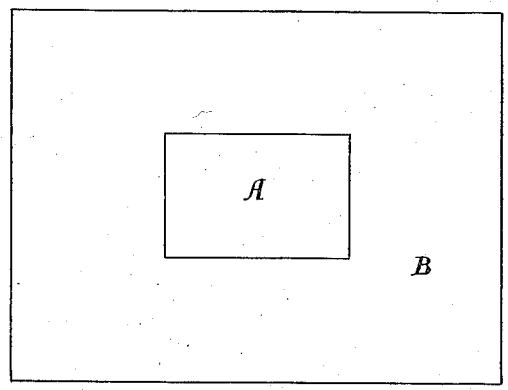
Figure 2:
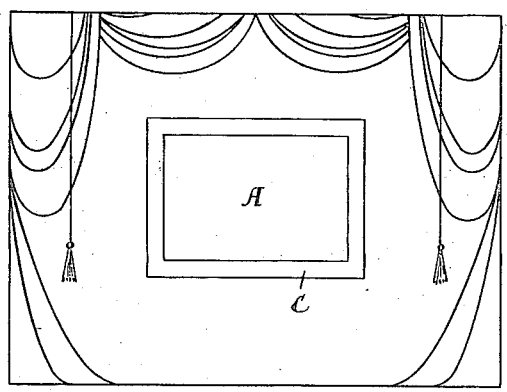
Figure 2 is a diagram illustrating an image projected on the screen and surounding the central picture.
Figure 3:
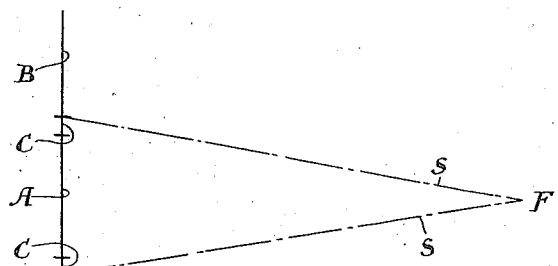
Figure 3 is an elevational diagram of the image shown in relation to the eye of the observer.

The image C is of course luminous and at a certain intensity of luminosity, say medium, it assumes a certain location in the mind of the observer on account of the natural judgment through the visual angle it embraces as illustrated in Figure 3. If this image C is caused to vary in size, that is, it is made to gradually creep inward toward the central picture, or expand away from it and coincidently its luminous intensity is diminished or increased it will have a direct effect upon the visual angle as illustrated in Figure 4.

Figure 4:
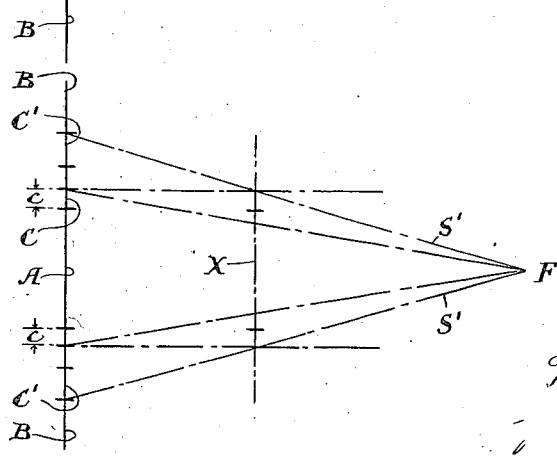
Figure 4 is a view similar to Figure 3 illustrating the illusion created by a change in the image.

If A is the central picture and the luminous image C has the dimension described by the boundary of A in Figure 3, the visual angle S is assumed, but if the image is distended to C' and coincidently its dimension c is proportionately increased the visual angle changes to S' and the observer F in accord with the known laws of vision will interpret that the image C has been advanced toward him as indicated by the line X, Figure 4. This illusion will of course be accentuated if the luminous intensity is coincidently increased.

The effect of this illusion is to interpose an element which will partially distract the nerves of the eye in the manner that the eye nerves are accustomed to function and as the framing image appears to move forward or backward there are produced two principal visual angles, one encompassing the central picture and one encompassing the surrounding luminous area. The eye in attempting to follow both angles which operate at variance with each other, fails to definitely locate the focal depth location of the central picture and this flexible focal condition produces the interpretation of depth in the central picture and relieves eye strain.

What I claim as my invention is:—

1. A method of producing visual depth in projected pictures, consisting in locating about the picture a flexible image forming a visual attraction and maintaining focal activity in the eye of the observer.

2. A method of producing visual depth in projected pictures, consisting in locating about the picture a luminous area of increasing and decreasing dimensions producing variation in the visual angle.

3. A method of producing visual depth in projected pictures, consisting in locating about the picture an image of variable luminosity.

4. A method of producing visual depth in projected pictures, consisting in locating about the picture a flexible image of variable luminosity.

5. A method of producing visual depth in projected pictures, consisting in surrounding the main picture with an image which is maintained in constant movement expanding or contracting to induce focal activity in the eye of the observer.

THOMAS HENRY MARTEN.